US012609290B2

(12) United States Patent
    Park et al.

(10) Patent No.:    US 12,609,290 B2
(45) Date of Patent:        Apr. 21, 2026

(54) FOREIGN MATERIAL REMOVAL DEVICE FOR NOTCHING SECONDARY BATTERY

(71) Applicant: LG Energy Solution, Ltd., Seoul (KR)

(72) Inventors: Jung Hyun Park, Daejeon (KR); Tae Su Kim, Daejeon (KR); Seo Jun Lee, Daejeon (KR); Hyo Jin Lee, Daejeon (KR); Gil Woo Kim, Daejeon (KR); Hyuk Soo Lee, Daejeon (KR); Byung Hee Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 465 days.

(21) Appl. No.:     18/030,392

(22) PCT Filed:     Apr. 1, 2022

(86) PCT No.:       PCT/KR2022/004687
     § 371 (c)(1),
     (2) Date:       Apr. 5, 2023

(87) PCT Pub. No.: WO2022/220454
     PCT Pub. Date: Oct. 20, 2022

(65)            Prior Publication Data
     US 2023/0378417 A1      Nov. 23, 2023

(30)          Foreign Application Priority Data

Apr. 14, 2021     (KR) ......................... 10-2021-0048528

(51) Int. Cl.
     *H01M 4/04*          (2006.01)
     *B08B 5/02*          (2006.01)
     (Continued)
(52) U.S. Cl.
     CPC .............. *H01M 4/04* (2013.01); *B08B 5/023* (2013.01); *B08B 5/043* (2013.01); *B08B 13/00* (2013.01);
     (Continued)

(58) Field of Classification Search
     CPC .......... H01M 4/04; B08B 5/023; B08B 5/043; B08B 13/00; B21D 28/02; G06T 7/70; G06T 2207/30108; H04N 23/90
                (Continued)

(56)            References Cited

U.S. PATENT DOCUMENTS

2014/0109934 A1    4/2014   Lee
     2018/0185889 A1    7/2018   Ishimabushi et al.

FOREIGN PATENT DOCUMENTS

JP        2017-142939 A     8/2017
     JP         201818681 A      2/2018
                (Continued)

OTHER PUBLICATIONS

Extended European Search Report including Written Opinion for Application No. 22788310.5 dated Jul. 2, 2024, pp. 1-9.
                (Continued)

*Primary Examiner* — Katina N. Henson
(74) *Attorney, Agent, or Firm* — Lerner David LLP

(57)              ABSTRACT

It is preferred that the foreign material removal device for notching a secondary battery according to one example of the present invention comprises: a foreign material confirmation part provided so that in a transport path of an electrode film through a notching process, the upper and lower surfaces of the notched electrode pattern are photographed, and a position of a foreign material present in the electrode pattern is calculated based on the photographed image; and a foreign material removal process part provided so that air is sprayed to the position of the foreign material and a vacuum pressure is applied thereto according to the foreign material position information calculated by the foreign material confirmation part.

16 Claims, 8 Drawing Sheets

(51) Int. Cl.
    B08B 5/04      (2006.01)
    B08B 13/00    (2006.01)
    B21D 28/02    (2006.01)
    G06T 7/70      (2017.01)
    *H04N 23/90*    (2023.01)

(52) U.S. Cl.
    CPC ................ B21D 28/02 (2013.01); G06T 7/70
        (2017.01); *G06T 2207/30108* (2013.01); *H04N*
                           *23/90* (2023.01)

(58) Field of Classification Search
    USPC ........................................................ 15/301
    See application file for complete search history.

(56)                 References Cited

FOREIGN PATENT DOCUMENTS

| | | | |
|---|---|---|---|
| KR | 2014-0049735 | A | 4/2014 |
| KR | 20150089803 | A | 8/2015 |
| KR | 2017-0063777 | A | 6/2017 |
| KR | 2020-0088533 | A | 7/2020 |

OTHER PUBLICATIONS

International Search Report for PCT/KR2022/004687 mailed Jul. 1, 2022. 3 pgs.

[Figure 1]
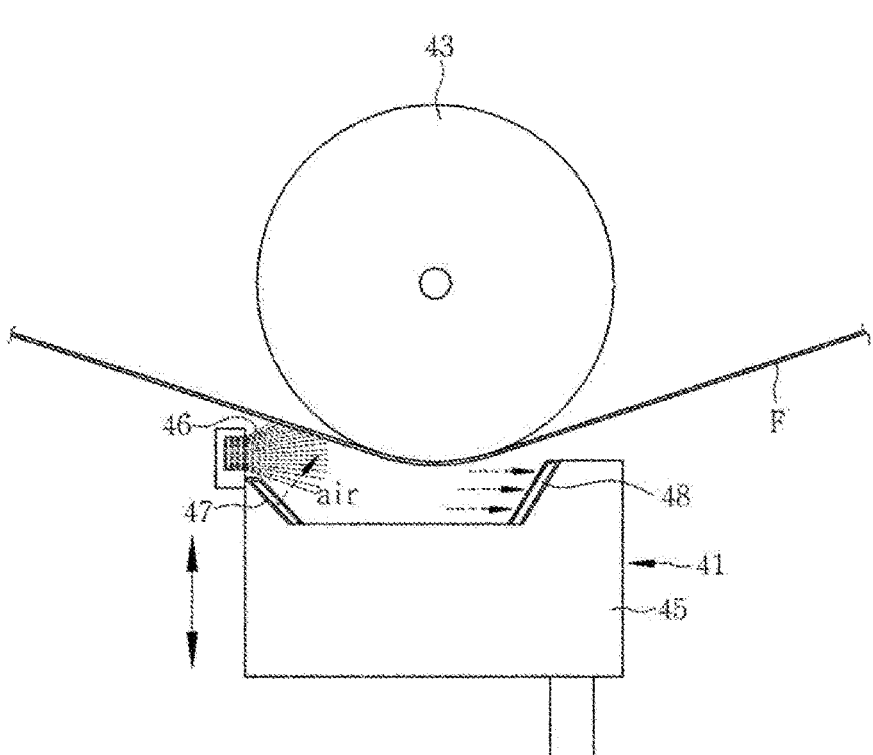

[Figure 2]
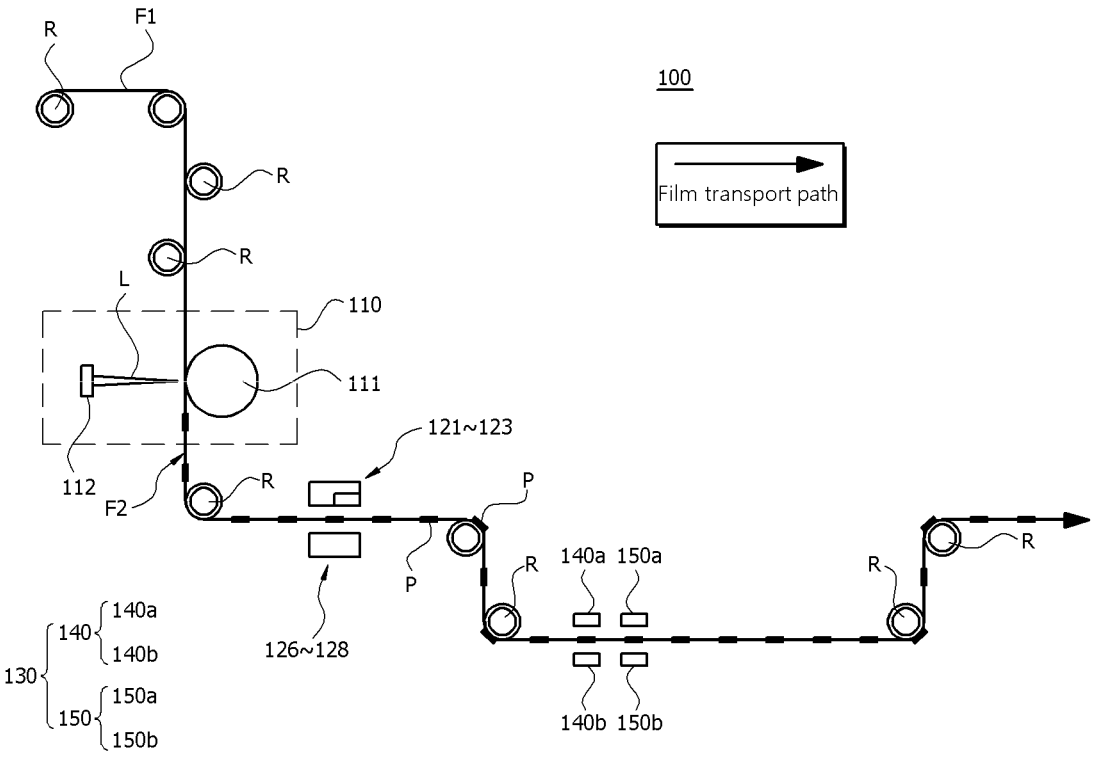

[Figure 3]
<u>100</u>
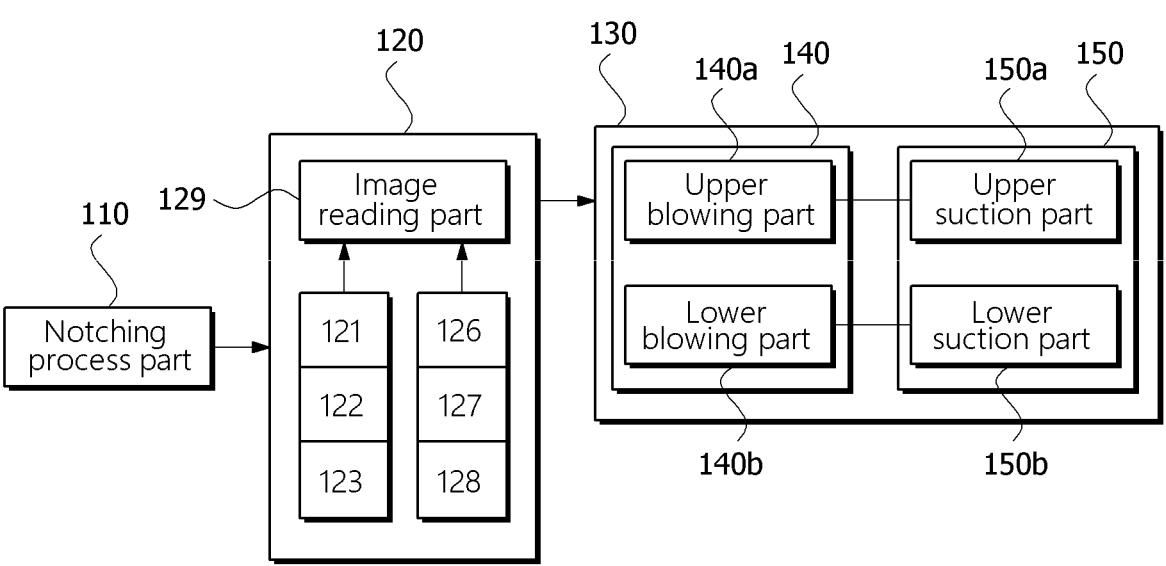

[Figure 4]
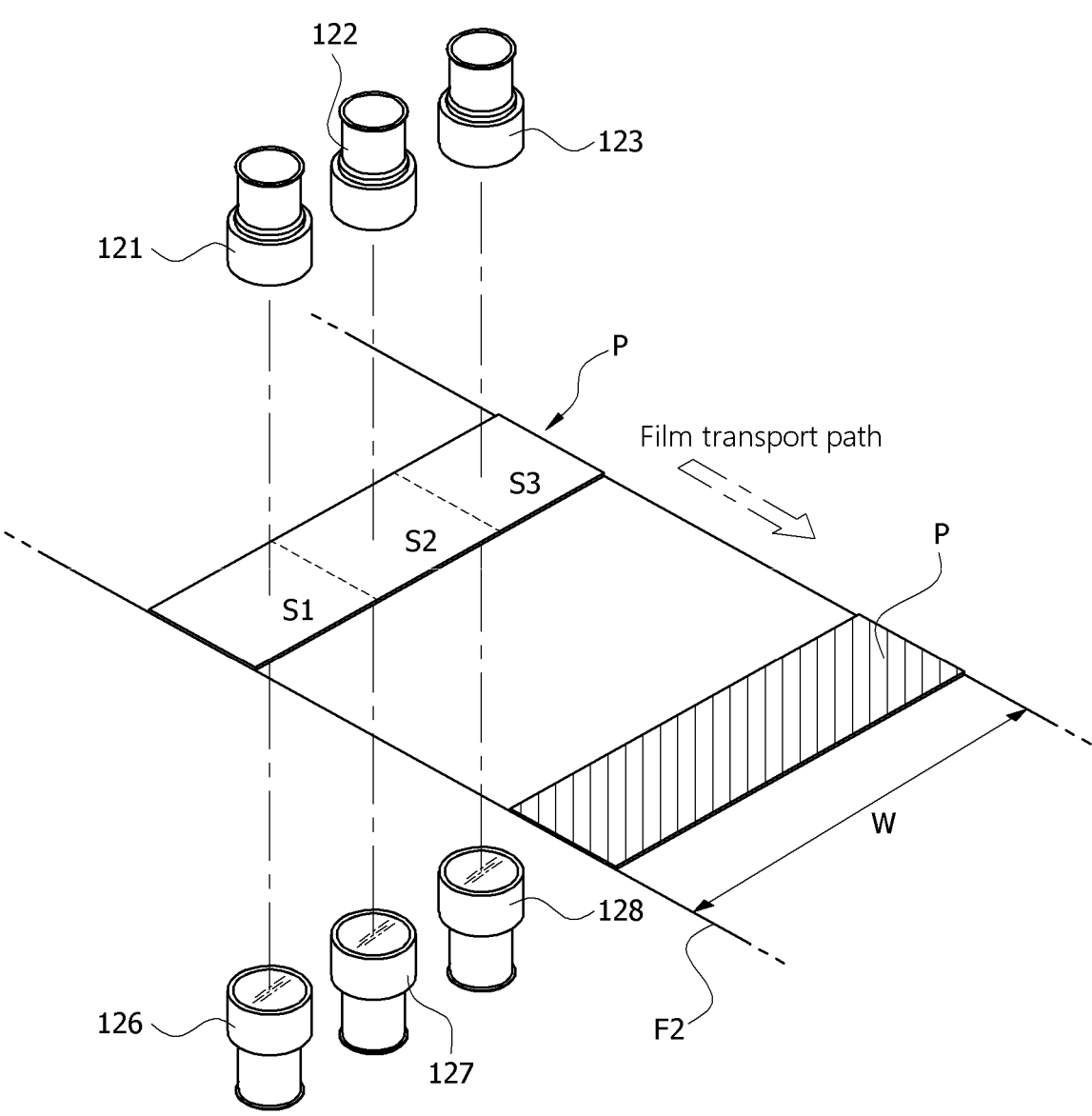

[Figure 5]
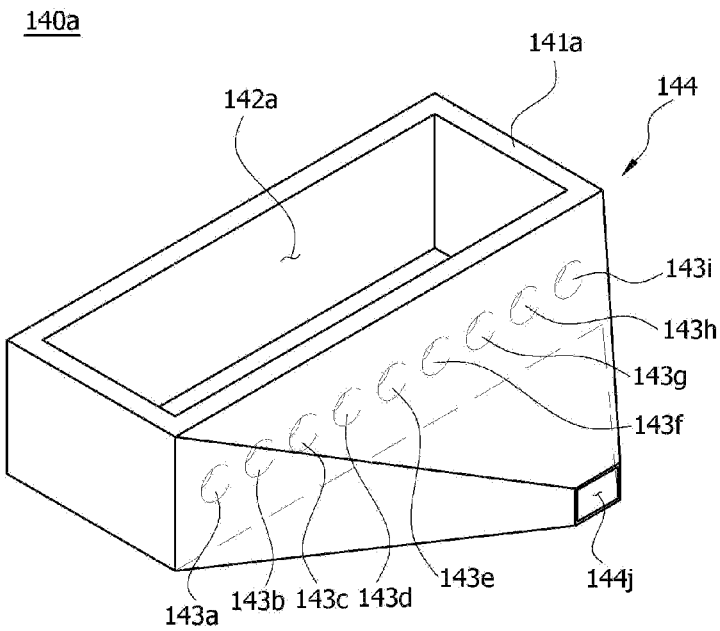
[Figure 6]
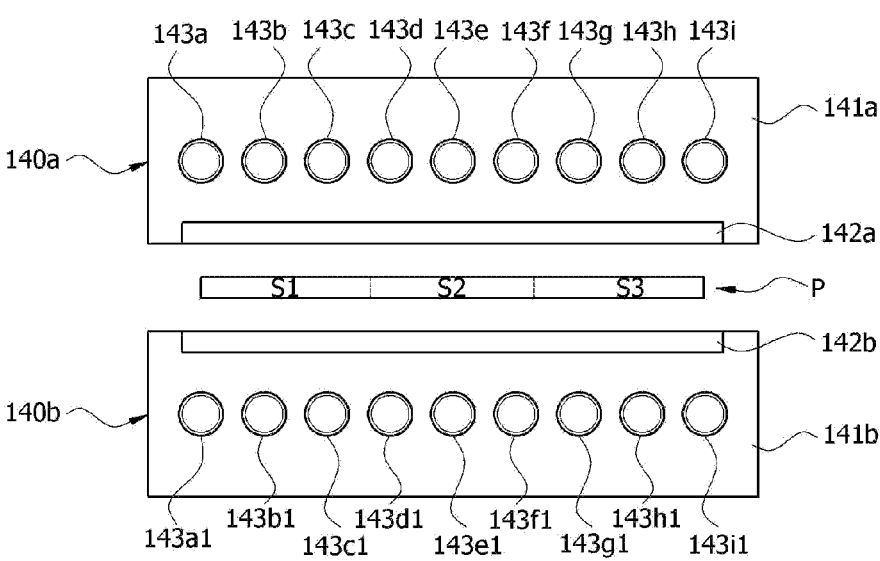

[Figure 7]
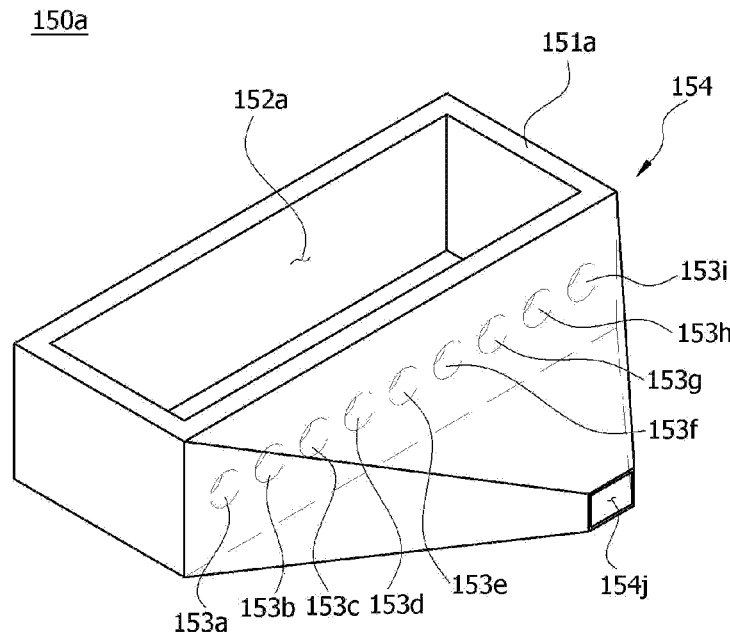
[Figure 8]
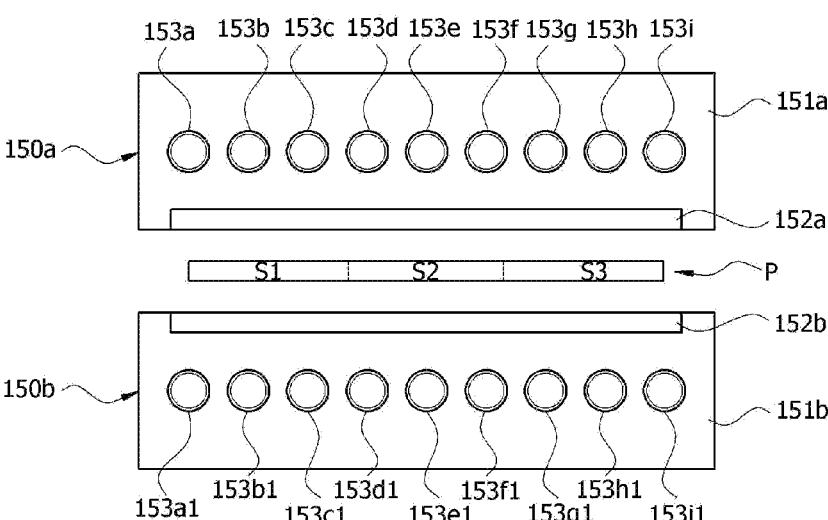

[Figure 9]
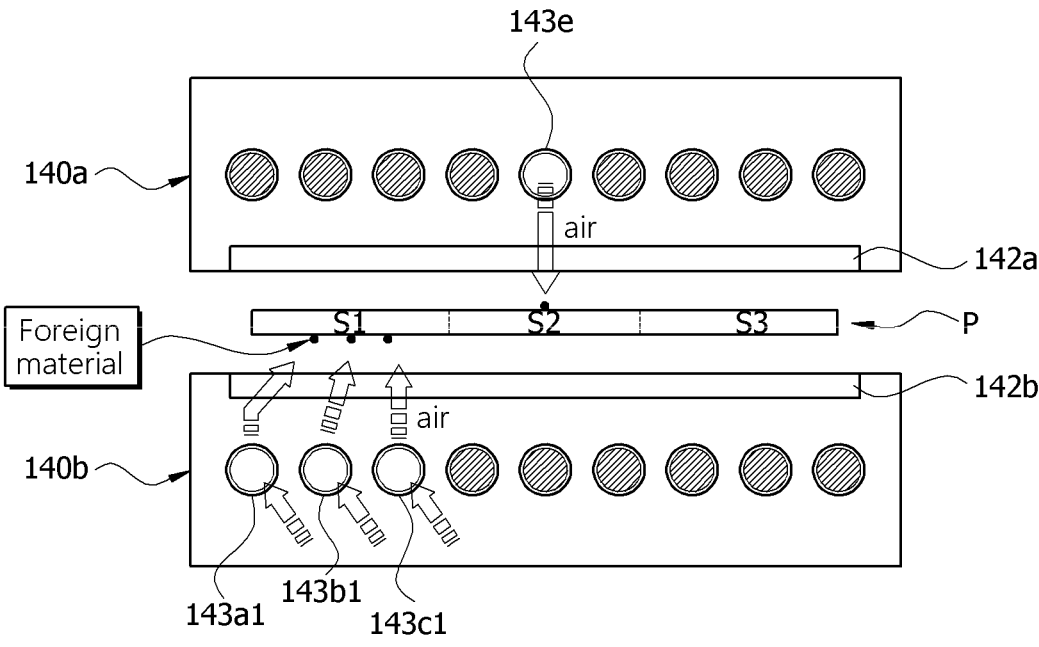
[Figure 10]
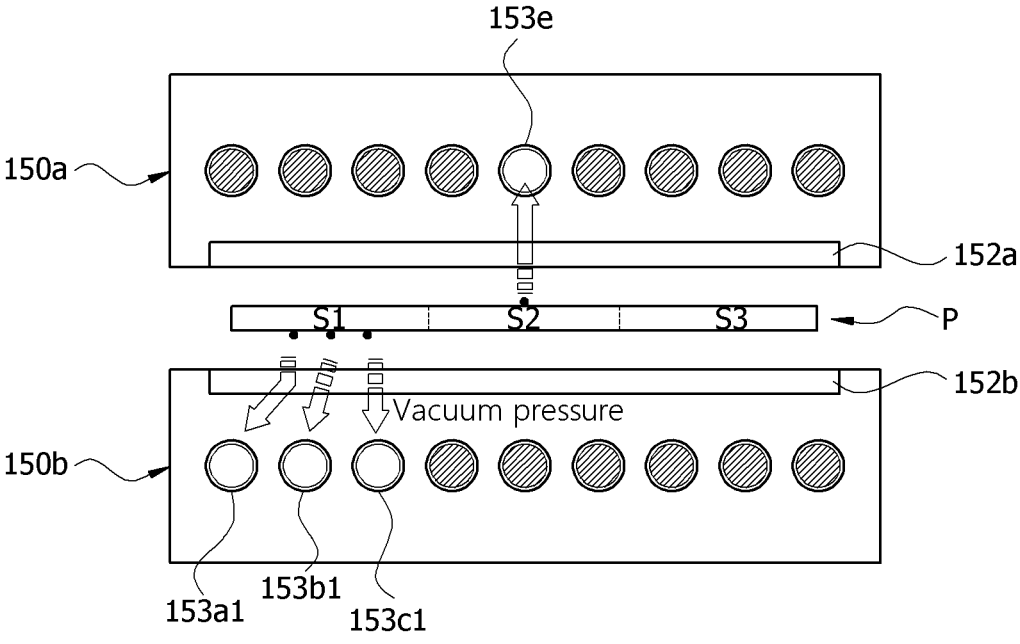

[Figure 11]
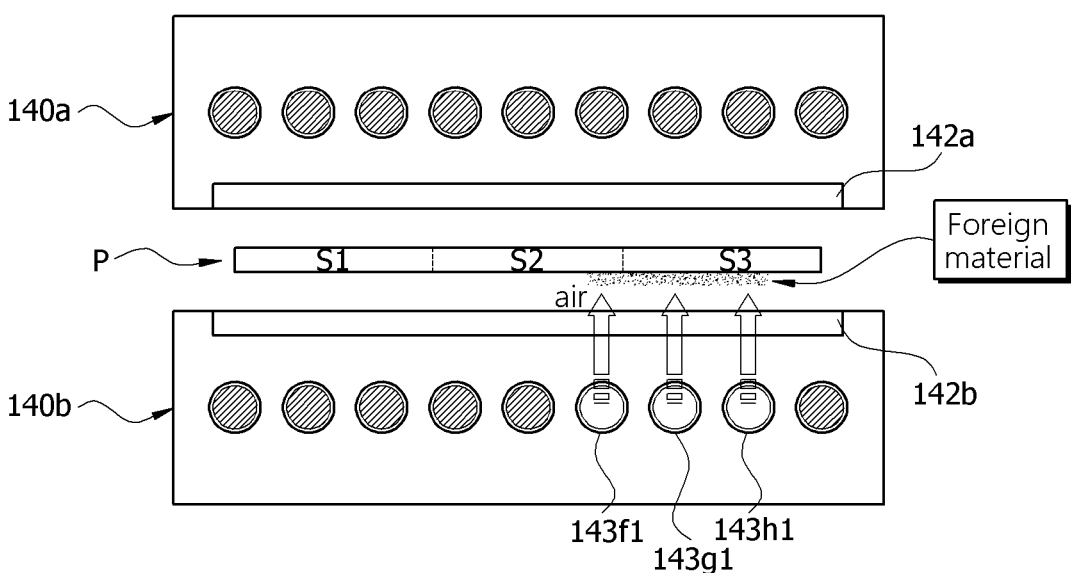
[Figure 12]
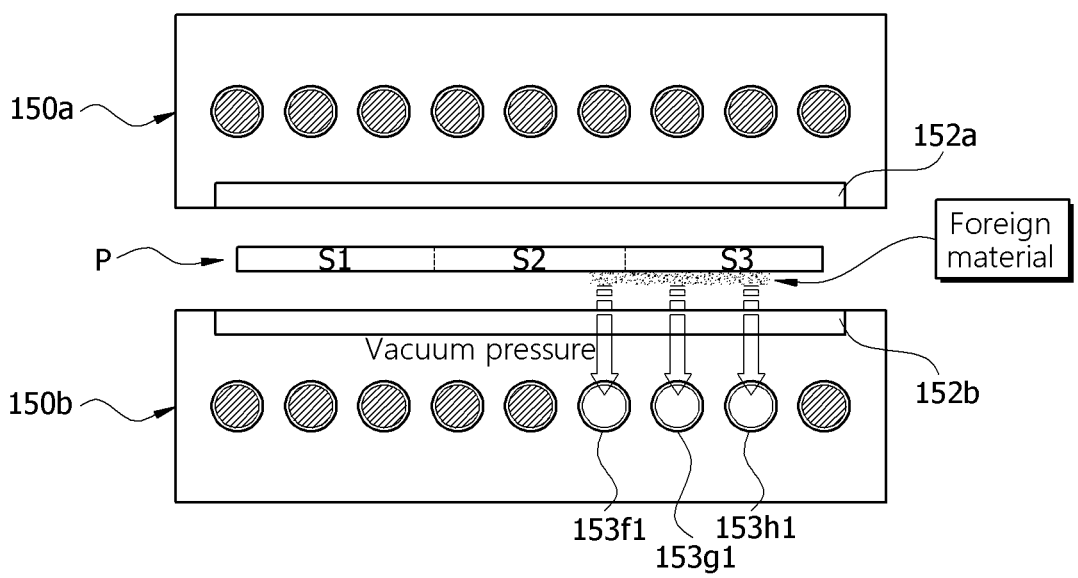

FOREIGN MATERIAL REMOVAL DEVICE FOR NOTCHING SECONDARY BATTERY

CROSS-REFERENCE TO RELATED APPLICATIONS

This application is a national stage entry under 35 U.S.C. § 371 of International Application No. PCT/KR2022/004687, filed on Apr. 1, 2022, which claims priority to Korean Patent Application No. 10-2021-0048528, filed on Apr. 14, 2021, the disclosures of which are hereby incorporated herein by reference in their entireties.

TECHNICAL FIELD

The present invention relates to a foreign material removal device for notching a secondary battery, which relates to, more particularly, a foreign material removal device for notching a secondary battery capable of intensively cleaning a part where the foreign material is present after confirming the position of the foreign material attached to an electrode film before a foreign material removal process.

BACKGROUND ART

In general, secondary batteries are batteries capable of supplying power to an external circuit by converting chemical energy into electrical energy, and storing electricity by receiving external power when discharged to convert electrical energy into chemical energy, where there are various types such as nickel-cadmium, lithium ion, nickel-hydrogen and lithium polymer.

Such a secondary battery is manufactured by applying an active material to a surface of an electrode current collector to form a positive electrode and a negative electrode, and interposing a separator therebetween to make an electrode assembly, which is subsequently mounted inside a cylindrical or polygonal metal can or aluminum laminate sheet pouch-type case, and then injecting or impregnating mainly a liquid electrolyte into the electrode assembly, or using a solid electrolyte.

Here, the electrode assembly is manufactured in various sizes according to the size and shape of the outer case and the capacity required in the field used, and to this end, a notching process of cutting the electrodes and the separator constituting the electrode assembly to a predetermined size is required.

In the notching process of the secondary battery, a mold or a laser is used, and in the notching process, foreign substances in the active material, Al foreign substances in the positive electrode, or Cu foreign substances in the negative electrode are generated during the process of cutting the electrode.

Some of the foreign substances generated during the notching process are attached to the electrode and cause short circuit failures of the battery. In order to prevent this, conventionally, a foreign material removal process of removing the foreign substances attached to the electrode plate in the notching process is performed.

Korean Registered Patent No. 10-1569798 discloses the contents of processing foreign substances attached to the surface of the electrode film (F) on which the shear processing is completed after the notching process is performed.

As shown in FIG. 1, a cleaning unit (41) is installed movably up and down on the lower side of a roller (43), and removes foreign substances while adhering the electrode film (F) to the roller (43). The cleaning unit (41) comprises a cleaning block (45), a brush (46), an air sprayer (47), and a foreign material suction aspirator (48).

The cleaning blocks (45) are installed movably up and down on the lower and upper sides of a first roller (43) and a second roller (44), respectively. The brush (46) is installed at the upper end or lower end of the cleaning block (45) to contact the electrode film (F), thereby separating foreign substances. The air sprayer (47) is installed on one side part of the cleaning block (45) to spray air toward the brush (46).

The foreign material suction aspirator (48) is installed at the opposite position of the air sprayer (47) in the cleaning block (45) to suck the foreign material separated from the brush (46) by the air sprayer (47).

According to Korean Registered Patent No. 10-1569798, a foreign material treatment process of removing foreign substances attached to the surface of the electrode film (F) on which the shear processing is completed is performed using the cleaning unit (41), but in spite of this foreign material removal process, there is a problem that the foreign material attached to the electrode film (F) is not removed. Later, the foreign material attached to the electrode film (F) may cause short circuit failures of the battery.

DISCLOSURE

Technical Problem

The present invention has been devised to solve the above problems, where it is an object, which is intended to be solved, to provide a foreign material removal device for notching a secondary battery capable of intensively cleaning a part where the foreign material is present after confirming the position of the foreign material attached to an electrode film before a foreign material removal process.

Technical Solution

It is preferred that the foreign material removal device for notching a secondary battery according to one example of the present invention comprises: a foreign material confirmation part provided so that in a transport path of an electrode film through a notching process, the upper and lower surfaces of the notched electrode pattern are photographed, and a position of a foreign material present in the electrode pattern is calculated based on the photographed image; and a foreign material removal process part provided so that air is sprayed to the position of the foreign material and a vacuum pressure is applied thereto according to the foreign material position information calculated by the foreign material confirmation part.

In one example of the present invention, it is preferred that the foreign material confirmation part comprises: a plurality of upper cameras arranged in a line along the width direction of the electrode film above the electrode film to photograph the upper surface of the electrode pattern for each section; a plurality of lower cameras arranged in a line along the width direction of the electrode film under the electrode film to photograph the lower surface of the electrode pattern for each section; and an image reading part for calculating the position of the foreign material based on a plurality of upper section images and a plurality of lower section images having position information for each section along the width direction of the electrode film.

In one example of the present invention, it is preferred that the foreign material removal process part sprays the air to each section of one surface of the electrode film, but is provided that the entire area of the section is sprayed or only a predetermined area within the entire area is intensively sprayed.

In one example of the present invention, it is preferred that the foreign material removal process part comprises: a foreign material blowing part for spraying air to the position of the foreign material according to the foreign material position information of the foreign material removal process part; and a foreign material suction part, which is installed in the transport path of the electrode film, for applying a vacuum pressure to the position of the foreign material based on the foreign material position information to suck the foreign material blown from the electrode pattern.

In one example of the present invention, it is preferred that the foreign material blowing part comprises: a blowing body provided with an air injection hole in which air is sprayed on the surface facing the electrode pattern; and a plurality of air holes provided in the blowing body, and communicated with the air injection hole, but arranged in a line along the width direction of the electrode film, wherein the plurality of air holes is allocated for each section of the electrode pattern according to the arrangement order in the width direction of the electrode film.

In one example of the present invention, it is preferred that the foreign material blowing part further comprises an air control part, which adjusts opening and closing, but opens an air hole matching the foreign material position information, and closes an air hole without matching the foreign material position information.

In one example of the present invention, it is preferred that the plurality of air holes is provided numerously for each section, and the air control part adjusts the opening number of the plurality of air holes allocated for each section to adjust the flow rate of air injected to the position of the foreign material.

In one example of the present invention, it is preferred that the plurality of air holes is provided with at least three for each section, and the air control part adjusts the opening number of the air holes to adjust the flow rate intensity of air to strong/medium/weak.

In one example of the present invention, it is preferred that the air injection hole is an opening larger than the area of the electrode pattern.

In one example of the present invention, it is preferred that the foreign material suction part comprises: a suction body provided with a main suction hole on the surface facing the electrode pattern; and a plurality of sub-suction holes provided in the suction body, and communicated with the main suction hole, but arranged in a line along the width direction of the electrode film, wherein the plurality of sub-suction holes is allocated for each section of the electrode pattern according to the arrangement order in the width direction of the electrode film.

In one example of the present invention, it is preferred that the foreign material suction part further comprises a vacuum pressure control part, which adjusts opening and closing of each sub-suction hole, but opens a sub-suction hole matching the foreign material position information, and closes a sub-suction hole without matching the foreign material position information.

In one example of the present invention, it is preferred that the plurality of sub-suction holes is provided numerously for each section, and the vacuum pressure control part adjusts the opening number of the plurality of sub-suction holes allocated for each section to adjust the strength of the vacuum pressure applied to the position of the foreign material.

In one example of the present invention, it is preferred that the plurality of sub-suction holes is provided with at least three for each section, and the vacuum pressure control part adjusts the opening number of the sub-suction holes to adjust the strength of the vacuum pressure to strong/medium/weak.

In one example of the present invention, it is preferred that the main suction hole is an opening larger than the area of the electrode pattern.

It is preferred that the foreign material removal device for notching a secondary battery according to one example of the present invention comprises: a foreign material confirmation part provided so that in a transport path of an electrode film through a notching process, at least one surface of the upper surface and the lower surface of the notched electrode pattern is photographed for each section of the electrode pattern along the width direction of the electrode pattern, and a position of a foreign material present in the electrode pattern is calculated based on the photographed image; and a foreign material removal process part provided so that air is sprayed to the entire area of the section where the foreign material is located, or air is intensively sprayed to a predetermined area within the entire area, and a vacuum pressure is applied thereto according to the foreign material position information calculated by the foreign material confirmation part.

Advantageous Effects

The prior art performs a foreign material removal process on the entire area of the electrode film, whereas the present invention confirms a position of a foreign material attached to an electrode film before a foreign material removal process, and then intensively cleans the portion where the foreign material is present, whereby it is possible to improve the foreign material removal efficiency in the electrode film.

DESCRIPTION OF DRAWINGS

FIG. 1 schematically illustrates a process of removing foreign substances after a notching process of a secondary battery according to the prior art.

FIG. 2 schematically illustrates a schematic diagram of a foreign material removal device for notching a secondary battery according to one example of the present invention.

FIG. 3 schematically illustrates a configuration diagram of a foreign material removal device for notching a secondary battery according to one example of the present invention.

FIG. 4 is a diagram for explaining an arrangement state of cameras for photographing an electrode pattern for each section by a plurality of cameras according to one example of the present invention.

FIGS. 5 and 6 are diagrams for explaining a foreign material blowing part in one example of the present invention, and FIGS. 7 and 8 are diagrams for explaining a foreign material suction part in one example of the present invention.

FIGS. 9 to 12 are diagrams for explaining the operation state of a foreign material removal process part when a foreign material is attached to an electrode pattern.

MODE FOR INVENTION

Hereinafter, foreign material removal devices for notching a secondary battery according to preferred examples of the present invention will be described with reference to the accompanying drawings.

Referring to FIGS. 2 and 3, the foreign material removal device (100) for notching a secondary battery is a device, which comprises a notching process part (110), a foreign material confirmation part (120), and a foreign material removal process part (130), for photographing an electrode pattern (P) after a notching process to confirm whether any foreign material is present in the electrode pattern (P), and then intensively cleaning a portion of the electrode pattern (P) where the foreign material is present.

The notching process part (110) notches the electrode film moving in one direction along the film transport path with a preset electrode pattern (P). The notching process part (110) is composed of a notching drum (111) and a laser irradiation part (112), where the electrode film (F1) passing through the notching drum (111) is irradiated with a laser to form an electrode pattern (P) on the electrode film. The notching process of the secondary battery is a well-known technology, whereby the detailed description of the notching process part (110) will be omitted herein.

The foreign material confirmation part (120) photographs the upper and lower surfaces of the electrode pattern (P) in the transport path of the electrode film, and reads the photographed image to calculate the position of the foreign material present in the electrode pattern. The foreign material confirmation part (120) comprises a plurality of cameras (121~123, 126~128), and an image reading part (129).

The plurality of cameras (121~123, 126~128) is installed so as to enable to photograph the upper and lower surfaces of the electrode pattern (P) that have passed through the notching process part (110) in the transport path of the electrode film, respectively. In this example, for convenience of explanation, according to the installation positions of the plurality of cameras (121~123, 126~128), they will be divided into and referred to as a first upper camera (121), a second upper camera (122), a third upper camera (123), a first lower camera (126), a second lower camera (127), and a third lower camera (128).

Referring to FIG. 4, the first upper camera (121) to the third upper camera (123) are arranged in a line along the width direction (W) of the electrode film above the electrode film (F2) to photograph the upper surface of the electrode pattern (P) for each section (S1, S2, S3). The first lower camera (126) to the third lower camera (128) are arranged in a line along the width direction (W) of the electrode film under the electrode film (F2) to photograph the lower surface of the electrode pattern (P) for each section (S1, S2, S3).

The electrode pattern (P) is divided into a plurality of sections (S1, S2, S3) along the width direction (W) of the electrode film, where the plurality of sections is variable according to the installation number of cameras. As shown in FIG. 4, when three upper cameras photograph the upper surface of the electrode pattern (P), the upper surface of the electrode pattern (P) is divided into three sections. If the four upper cameras photograph the upper surface of the electrode pattern (P), the upper surface of the electrode pattern (P) may be divided into four sections.

The image reading part (129) reads a plurality of upper section images and a plurality of lower section images photographed for each section (S1, S2, S3), and confirms whether any foreign material is present in the electrode pattern (P), thereby selecting the foreign material section where the foreign material exists among the plurality of sections (S1, S2, S3), and confirming the position of the foreign material in the foreign material section.

In this example, for the plurality of upper section images, the upper surface of the first section (S1) photographed by the first upper camera (121) is referred to as a first upper section image; the upper surface of the second section (S2) photographed by the second upper camera (122) is referred to as a second upper section image; and the upper surface of the third section (S3) photographed by the third upper camera (123) is referred to as a third upper section image.

Then, in this example, for the plurality of lower section images, the lower surface of the first section (S1) photographed by the first lower camera (126) is referred to as a first lower section image; the lower surface of the second section (S2) photographed by the second lower camera (127) is referred to as a second lower section image; and the lower surface of the third section (S3) photographed by the third lower camera (128) is referred to as a third lower section image.

In the image reading part (129), the position information for each section image photographed by each camera is set according to the installation position of the camera, and when reading the image, the section information in which the foreign material exists is calculated, and the position information of the foreign material is calculated based on the specification of the foreign material section. In this example, the section where a foreign material exists among the plurality of sections (S1, S2, S3) of the electrode pattern (P) is referred to as a "foreign material section".

The foreign material present in the electrode pattern (P) is subjected to cleaning in the foreign material removal process part (130). The foreign material removal process part (130) is installed in the transport path of the electrode film, and sprays air to the foreign material section of the electrode pattern (P) according to the foreign material position information of the image reading part (129) and then applies a vacuum pressure thereto, thereby sucking the foreign material in the foreign material section to remove the foreign material from the electrode pattern (P).

The foreign material removal process part (130) comprises a foreign material blowing part (140) and a foreign material suction part.

The foreign material blowing part (140) intensively sprays air to the foreign material section of the electrode pattern (P), and blows the foreign material in the foreign material section. The foreign material blowing part (140) is installed to face the upper and lower surfaces of the electrode film.

In this example, for convenience of explanation, the foreign material blowing part (140) installed on the upper portion of the electrode film is referred to as the upper blowing part (140a), and the foreign material blowing part (140) installed on the lower portion of the electrode film is referred to as the lower blowing part (140b). The upper blowing part (140a) and the lower blowing part (140b) have the same structure and operation method except for only the installation positions different from each other, whereby in order to avoid repetition of the description, the upper blowing part (140a) will be described below.

Referring to FIG. 5, the upper blowing part (140a) comprises a blowing body (141a) and an air control part (144). The blowing body (141a) is provided with an air injection hole (142a) and a plurality of air holes (143a-143i).

The air injection hole (142a) is an opening through which the air supplied from the air control part (144) is injected toward the electrode pattern (P). The air injection hole (142a) is provided on the surface facing the electrode pattern (P). The air injection hole (142a) is provided to be larger than the area of the electrode pattern (P).

The plurality of air holes (143a-143i) is arranged in a line along the width direction (W) of the electrode film. The plurality of air holes (143a-143i) is provided in the blowing body (141a) to be communicated with the air injection hole (142a).

The plurality of air holes (143a-143i) is provided at least three for each section (S1, S2, S3), whereby the intensity of the air injected for each section (S1, S2, S3) through the opening number of air holes may be adjusted to strong/medium/weak.

In this example, for convenience of explanation, the plurality of air holes of the upper blowing part (140a) and the lower blowing part (140b) are divided to and referred to as first air holes (143a, 143a1) to ninth air holes (143i, 143i1) according to the arrangement order in the width direction (W) of the electrode film.

The first air holes (143a, 143a1) to the ninth air holes (143i, 143i1) are allocated for each section (S1, S2, S3) of the electrode pattern (P) according to the arrangement order in the width direction (W) of the electrode film. For example, when the electrode pattern (P) is divided into three sections, the first air holes (143a, 143a1) to the third air holes (143c, 143c1); the fourth air holes (143d, 143d1) to the sixth air holes (143f, 143f1); and the seventh air holes (143g, 143g1) to the ninth air holes (143i, 143i1) are allocated as air holes for supplying air to the first section (S1) of the electrode pattern (P); the second section (S2) of the electrode pattern (P); and the third section (S3) of the electrode pattern (P), respectively.

The air control part (144) adjusts opening and closing of each air hole, but opens an air hole matching the foreign material position information of the image reading part (129), and closes an air hole without matching the foreign material position information. The air control part (144) may adjust the flow rate of air injected into the foreign material section through opening and closing of at least three air holes allocated for each section (S1, S2, S3).

The air introduced through the air supply hole (144j) flows to the blowing body (141a) through the opened air hole, and is sprayed into the electrode pattern (P) through the air injection hole (142a).

Through selective opening and closing of the plurality of air holes (143a-143i) by the air control part (144), the present invention may also spray air to the entire area of the section selected as the foreign material section, but may intensively spray air thereto by specifying the position where the foreign material exists among the foreign material sections.

The foreign material suction part (150) is installed in parallel with the foreign material blowing part (140). The foreign material suction part (150) applies a vacuum pressure to the electrode pattern (P) according to the foreign material position information of the image reading part (129), and sucks the foreign material blown from the electrode pattern (P) by the foreign material blowing part (140), thereby removing the foreign material from the electrode pattern (P).

The foreign material suction part (150) is installed to face the upper and lower surfaces of the electrode film (F2). Accordingly, in this example, for convenience of explanation, the foreign material suction part (150) installed on the upper portion of the electrode film is referred to as an upper suction part (150a), and the foreign material suction part (150) installed on the lower portion of the electrode film is referred to as a lower suction part (150b). The upper suction part (150a) and the lower suction part (150b) have the same structure and operation method except for only the installation positions different from each other, whereby in order to avoid repetition of the description, the upper suction part (150a) will be described below.

Referring to FIG. 5, the upper suction part (150a) comprises a suction body (151a) and a vacuum pressure control part (154). The suction body (151a) is provided with a main suction hole (152a) and a plurality of sub-suction holes (153a-153i).

The main suction hole (152a) is an opening through which the vacuum pressure supplied from the vacuum pressure control part (154) is supplied toward the electrode pattern (P). The main suction hole (152a) is provided on the surface facing the electrode pattern (P). The main suction hole (152a) is provided to be larger than the area of the electrode pattern (P).

The plurality of sub-suction holes (153a-153i) is arranged in a line along the width direction (W) of the electrode film. The plurality of sub-suction holes (153a-153i) is provided in the suction body (151a) to be communicated with the main suction hole (152a). The plurality of sub-suction holes (153a-153i) is provided at least three for each section (S1, S2, S3), whereby the strength of the vacuum pressure applied to each section (S1, S2, S3) through the opening number of sub-suction holes may be adjusted to strong/medium/weak.

The vacuum pressure control part (154) adjusts opening and closing of each sub-suction hole, but opens a sub-suction hole matching the foreign material position information of the image reading part (129), and closes a sub-suction hole without matching the foreign material position information. The vacuum pressure control part (154) may adjust the strength of the vacuum pressure supplied to the foreign material section through opening and closing of at least three sub-suction holes allocated for each section (S1, S2, S3).

The vacuum pressure flows to the suction body (151a) through the vacuum pressure supply hole (154j) and the opened sub-suction hole, which is supplied to the electrode pattern (P) through the main suction hole (152a). The vacuum pressure is not applied to the entire area of the electrode pattern (P), but is applied limitedly to the portion selected as the foreign material section and/or the foreign material position. When the suction of the foreign material into the suction body (151a) is completed by the vacuum pressure, the vacuum pressure control part (154) releases the vacuum pressure applied to the main suction hole (152a).

In this example, for convenience of explanation, the plurality of sub-suction holes of the upper suction part (150a) and the lower suction part (150b) are divided to and referred to as first suction holes (153a, 153a1) to ninth suction holes (153i, 153i1) according to the arrangement order in the width direction (W) of the electrode film.

The first suction holes (153a, 153a1) to the ninth suction holes (153i, 153i1) are allocated for each section (S1, S2, S3) of the electrode pattern (P) according to the arrangement order in the width direction (W) of the electrode film. For example, when the electrode pattern (P) is divided into three sections, the first suction holes (153a, 153a1) to the third suction holes (153c, 153c1); the fourth suction holes (153d, 153d1) to the sixth suction holes (153f, 153f1); and the seventh suction holes (153g, 153g1) to the ninth suction holes (153i, 153i1) are allocated as sub-suction holes for supplying a vacuum pressure to the first section (S1) of the electrode pattern (P); the second section (S2) of the electrode pattern (P); and the third section (S3) of the electrode pattern (P), respectively.

Hereinafter, when a foreign material is present in the electrode pattern (P), a process of removing the foreign material will be described with reference to FIGS. 9 to 12.

In the foreign material removal process to be described below, it is assumed that the electrode pattern (P) is photographed by a plurality of cameras (121~123, 126~128) according to the above-described process, and the position of the foreign material present in the electrode pattern (P) is calculated from a plurality of upper section images and a plurality of lower section images as photographed.

For example, as shown in FIGS. 9 and 10, when foreign materials are attached to the lower surface and upper surface of the electrode pattern (P), the foreign material sections are calculated as the lower surface of the first section (S1) of the electrode pattern (P) and the upper surface of the second section (S2) by the image reading part (129).

When the foreign material is distributed over the entire area of the lower surface of the first section (S1), the lower blowing part (140b) opens the first air hole (143a1) to the third air hole (143c1) corresponding to the lower surface of the first section (S1), and closes the fourth air hole (143d1) to the ninth air hole (143i1) allocated to the remaining sections.

Accordingly, the air flows to the air injection hole (142b) through the first air hole (143a1) to the third air hole (143c1), and is sprayed to the lower surface of the first section (S1). The foreign materials present in the lower surface of the first section (S1) are blown by air and removed by the lower suction part (150b).

Referring to FIG. 10, the lower suction part (150b) applies a vacuum pressure to the air injection range of the lower blowing part (140b) in order to remove foreign materials on the lower surface of the first section (S1). Specifically, the lower suction part (150b) opens the first suction hole (153a1) to the third suction hole (153c1) corresponding to the lower surface of the first section (S1), and closes the fourth suction hole (153d1) to the ninth suction hole (153i1) allocated to the remaining sections. Accordingly, the vacuum pressure flows to the main suction hole (152b) through the first suction hole (153a1) to the third suction hole (153c1), and is supplied to the lower surface of the first section (S1). The foreign materials present in the lower surface of the first section (S1) are sucked into the main suction hole (152b) by the vacuum pressure. When the foreign material suction is completed, the vacuum pressure control part of the lower suction part (150b) releases the application of the vacuum pressure through the first suction hole (153a1) to the third suction hole (153c1).

Meanwhile, as shown in FIG. 9, when the foreign material exists only in the center of the upper surface of the second section (S2), the upper blowing part (140a) opens only the fifth air hole (143e) for injecting air to the center of the second section (S2), and closes the remaining air holes. Accordingly, the air flows to the air injection hole (142a) through the fifth air hole (143e) of the upper blowing part (140a), and is sprayed onto the upper surface of the second section (S2) to blow the foreign material. The foreign material blown from the upper surface of the second section (S2) is removed from the electrode pattern (P) by the operation of the upper suction part (150a).

The upper suction part (150a) opens only the fifth suction hole (153e), and closes the remaining sub-suction holes to apply the vacuum pressure only to the fifth suction hole (153e). The vacuum pressure is supplied to the main suction hole (152a) through the fifth suction hole (153e) to suck the foreign material present in the center of the second section (S2). The foreign material is removed from the electrode pattern (P) while being sucked into the main suction hole (152a) by the vacuum pressure.

As another example, referring to FIGS. 11 and 12, when the foreign materials are distributed in the second section (S2) and the third section (S3) on the lower surface of the electrode pattern (P), the operation of the foreign material removal process part (130) will be explained below.

As a result of reading the image reading part (129), when there is no foreign material on the upper surface of the electrode pattern (P), the upper blowing part (140a) and the upper suction part (150a) are not operated.

As shown in FIG. 11, when the foreign materials are distributed over a portion of the lower surface of the second section (S2) and the lower surface of the third section (S3), the lower blowing part (140b) selectively opens only the six air hole (143f1) to the eighth air hole (143h1) among the fourth air hole (143d1) to the ninth air hole (143i1) allocated to the lower surface of the second section (S2) and the lower surface of the third section (S3) according to the foreign material position information of the image reading part (129), whereby it can spray air only to the portions where the foreign materials are present. By the operation of the lower blowing part (140b), the foreign materials blown from the lower surface of the second section (S2) and the lower surface of the third section (S3) are removed from the electrode pattern (P) by the lower suction part (150b).

Referring to FIG. 12, the lower suction part (150b) opens only the sixth suction hole (153f1) to the eighth suction hole (153h1), and applies the vacuum pressure to the main suction hole (152b), thereby sucking the foreign materials on the lower surface of the second section (S2) and the lower surface of the third section (S3).

In the above manner, the present invention can intensively clean only portions where foreign materials are present by applying a vacuum pressure only to the portions where the foreign materials are present according to the foreign material position information of the image reading part (129) to suck the foreign materials.

Those having ordinary knowledge in the technical field to which the present invention pertains will be able to understand that the present invention may be implemented in other specific forms without changing the technical spirit or essential features thereof.

Therefore, it is to be understood that the examples described above are illustrative in all respects, and not restrictive.

INDUSTRIAL APPLICABILITY

The present invention can improve a foreign material removal efficiency from an electrode film by confirming the position of the foreign material attached to the electrode film before a foreign material removal process, and then intensively cleaning the portion where the foreign material exists.

The invention claimed is:

1. A foreign material removal device for notching a secondary battery, the foreign material removal device comprising:

a foreign material confirmation part disposed adjacent to a transport path of an electrode film downstream from a notching device, the foreign material confirmation part configured to photograph upper and lower surfaces of a notched electrode pattern of the electrode film and configured to calculate a position of a foreign material present in the notched electrode pattern based on a photographed image; and a foreign material removal part configured to spray air towards the position of the foreign material and configured to apply a vacuum pressure to the position of the foreign material according to information calculated by the foreign material confirmation part.

2. The foreign material removal device according to claim 1, wherein the foreign material confirmation part comprises:

a plurality of upper cameras arranged in an upper line along a width direction of the electrode film above the electrode film, the plurality of upper cameras configured to photograph an upper surface of the notched electrode pattern in a plurality of sections, respectively;

a plurality of lower cameras arranged in a lower line along the width direction of the electrode film under the electrode film, the plurality of lower cameras configured to photograph a lower surface of the notched electrode pattern in the plurality of sections, respectively; and an image reading part configured to calculate the position of the foreign material based on a plurality of upper section images and a plurality of lower section images having position information for each of the plurality of sections along the width direction of the electrode film.

3. The foreign material removal device according to claim 2, wherein the foreign material removal part is configured to spray the air towards each section of one of the upper surface or the lower surface of the electrode film.

4. The foreign material removal device according to claim 1, wherein the foreign material removal part comprises:

a foreign material blowing part configured to spray the air towards the position of the foreign material according to the information calculated by the foreign material confirmation part; and a foreign material suction part disposed adjacent to the transport path of the electrode film and configured to apply a vacuum pressure to the position of the foreign material to suck the foreign material from the notched electrode pattern.

5. The foreign material removal device according to claim 4, wherein the foreign material blowing part comprises:

a blowing body having an air injection hole configured to receive spraying of the air therethrough, the air injection hole located on a surface of the blowing body facing the transport path of the electrode film; and a plurality of air holes extending into the blowing body, the plurality of air holes being in communication with the air injection hole and arranged in a line along a width direction of the electrode film, wherein each of the plurality of air holes is configured to blow air towards one section of the notched electrode pattern at a corresponding location in the width direction of the electrode film.

6. The foreign material removal device according to claim 5, wherein the foreign material blowing part further comprises an air control part configured to open one or more of the air holes matching the information calculated by the foreign material confirmation part, and configured to close one or more of the air holes not matching the information calculated by the foreign material confirmation part.

7. The foreign material removal device according to claim 6, wherein the plurality of air holes includes multiple air holes configured to be aligned with each section of the notched electrode pattern, and the air control part is configured to adjust how many of the plurality of air holes will be opened to adjust the flow rate of the air towards the foreign material.

8. The foreign material removal device according to claim 7, wherein the plurality of air holes include at least three air holes configured to be aligned with each section of the notched electrode pattern, and the air control part is configured to adjust a flow rate intensity of the air.

9. The foreign material removal device according to claim 5, wherein the air injection hole has an opening area larger than an area of the notched electrode pattern.

10. The foreign material removal device according to claim 4, wherein the foreign material suction part comprises:

a suction body having a main suction hole on a surface of the suction body facing the transport path of the electrode film; and a plurality of sub-suction holes extending into the suction body, the plurality of sub-suction holes being in communication with the main suction hole and arranged in a line along a width direction of the electrode film, wherein each of the plurality of sub-suction holes is configured to apply the vacuum pressure to one section of the notched electrode pattern at a corresponding location in the width direction of the electrode film.

11. The foreign material removal device according to claim 10, wherein the foreign material suction part further comprises a vacuum pressure control part configured to open one or more of the sub-suction holes matching the information calculated by the foreign material confirmation part, and configured to close one or more of the sub-suction holes not matching the information calculated by the foreign material confirmation part.

12. The foreign material removal device according to claim 11, wherein the plurality of sub-suction holes includes multiple sub-suction holes configured to be aligned with each section of the notched electrode pattern, and the vacuum pressure control part is configured to adjust how many of the plurality of sub-suction holes will be opened to adjust the strength of the vacuum pressure applied to the foreign material.

13. The foreign material removal device according to claim 12, wherein the plurality of sub-suction holes include at least three sub-suction holes configured to be aligned with each section of the notched electrode pattern, and the vacuum pressure control part is configured to adjust a strength of the vacuum pressure.

14. The foreign material removal device according to claim 10, wherein the main suction hole has an opening area larger than an area of the notched electrode pattern.

15. The foreign material removal device according to claim 1, wherein the notched electrode pattern has a plurality of sections along a width direction of the notched electrode pattern, and the foreign material removal part is configured to spray the air towards one or more of the sections where the foreign material is located.

16. The foreign material removal device according to claim 2, wherein the foreign material removal part is configured to intensively spray the air towards one or more of the sections but not all of the sections of one of the upper surface or the lower surface of the electrode film.

\* \* \* \* \*